(12) United States Patent
Wang

(10) Patent No.: US 9,700,949 B2
(45) Date of Patent: Jul. 11, 2017

(54) RECIPROCATING DRIVE MECHANISM AND POWER TOOL INCLUDING THE SAME

(71) Applicants: Bosch Power Tools (China) Co. Ltd., Hangzhou, Zhejiang (CN); Robert Bosch GmbH, Stuttgart (DE)

(72) Inventor: Yanchao Wang, Zhejiang (CN)

(73) Assignees: Bosch Power Tools (China) Co. Ltd., Hangzhou, Zhejiang (CN); Robert Bosch GmbH, Stuttgart (DE)

( * ) Notice: Subject to any disclaimer, the term of this patent is extended or adjusted under 35 U.S.C. 154(b) by 47 days.

(21) Appl. No.: 14/449,855

(22) Filed: Aug. 1, 2014

(65) Prior Publication Data
US 2015/0033565 A1    Feb. 5, 2015

(30) Foreign Application Priority Data

Aug. 2, 2013  (CN) .......................... 2013 1 0335283

(51) Int. Cl.
| | | |
|---|---|---|
| B27B 3/12 | (2006.01) | |
| B27B 3/26 | (2006.01) | |
| F16H 21/00 | (2006.01) | |
| F16H 33/10 | (2006.01) | |
| B23D 51/16 | (2006.01) | |
| B23D 49/16 | (2006.01) | |

(52) U.S. Cl.
CPC ........... B23D 51/16 (2013.01); B23D 49/162 (2013.01)

(58) Field of Classification Search
CPC ............................. B23D 15/16; B23D 49/162
USPC ............................ 30/392, 393; 74/25, 86–87
See application file for complete search history.

(56) References Cited

U.S. PATENT DOCUMENTS

| | | | | | |
|---|---|---|---|---|---|
| 3,537,490 | A | * | 11/1970 | Shaw ..................... | B23D 51/02 30/394 |
| 3,729,823 | A | * | 5/1973 | Bos ....................... | B23D 49/162 30/394 |
| 5,079,844 | A | * | 1/1992 | Palm ..................... | B23D 49/162 30/392 |
| 5,555,626 | A | * | 9/1996 | Fuchs .................... | B23D 51/16 30/392 |
| 5,566,458 | A | * | 10/1996 | Bednar ................. | B23D 49/162 173/178 |

(Continued)

FOREIGN PATENT DOCUMENTS

GB        2 256 905 A      12/1992

*Primary Examiner* — Ghassem Alie
*Assistant Examiner* — Bharat C Patel
(74) *Attorney, Agent, or Firm* — Maginot, Moore & Beck LLP

(57) ABSTRACT

A reciprocating drive mechanism for a power tool includes a rotatably mounted transmission shaft that has a first central axis, a spindle with a spindle body, and a counterweight for linearly reciprocating motion under the guide of at least one guiding rod. A wobble plate is mounted on the transmission shaft and includes a first arm and second arms extending in opposite directions. The first arm and second arms are configured to cooperate with the spindle and the counterweight respectively so that, upon rotation of the transmission shaft, the first and second arms of the wobble plate drive the spindle and the counterweight to reciprocate in opposite directions parallel to the second central axis. An angle is formed between the extending direction of the first arm and the second arm and a plane defined by the first central axis and the second central axis.

11 Claims, 2 Drawing Sheets

(56) References Cited

U.S. PATENT DOCUMENTS

| | | | | |
|---|---|---|---|---|
| 6,286,217 B1* | 9/2001 | Dassoulas | B23D 51/16 | 30/220 |
| 6,508,151 B1* | 1/2003 | Neitzell | B23D 51/16 | 30/393 |
| 6,568,089 B1* | 5/2003 | Popik | B23D 49/162 | 30/392 |
| 7,096,590 B2* | 8/2006 | Marinkovich | B23D 51/16 | 30/392 |
| 7,117,601 B2* | 10/2006 | Hai-Chun | B23D 51/16 | 30/392 |
| 7,287,600 B2* | 10/2007 | Braun | B25D 11/062 | 173/109 |
| 7,637,018 B2* | 12/2009 | Zhang | B23D 51/10 | 30/392 |
| 7,707,729 B2* | 5/2010 | Moreno | B23D 49/165 | 30/392 |
| 7,797,841 B2* | 9/2010 | Moreno | B23D 51/16 | 30/392 |
| 7,814,666 B2* | 10/2010 | Oberheim | B23D 49/165 | 30/392 |
| 7,996,996 B2* | 8/2011 | Hirabayashi | B23D 51/16 | 30/392 |
| 8,011,445 B2* | 9/2011 | Duesselberg | B25D 16/003 | 173/104 |
| 8,307,910 B2* | 11/2012 | Holmes | B23D 49/165 | 173/19 |
| 8,464,805 B2* | 6/2013 | Baumann | B25D 11/062 | 173/109 |
| 8,549,762 B2* | 10/2013 | Oberheim | B23D 49/165 | 30/392 |
| 9,073,563 B2* | 7/2015 | Middleton | B26B 7/00 | |
| 2001/0034942 A1* | 11/2001 | Marinkovich | B23D 51/16 | 30/393 |
| 2005/0178012 A1* | 8/2005 | Neitzell | B23D 49/165 | 30/392 |
| 2006/0117580 A1* | 6/2006 | Serdynski | B23D 49/167 | 30/392 |
| 2008/0184569 A1* | 8/2008 | Moreno | B23D 49/165 | 30/392 |
| 2011/0107608 A1* | 5/2011 | Wattenbach | B23D 49/165 | 30/394 |
| 2012/0192438 A1* | 8/2012 | Aoki | B23D 51/16 | 30/392 |

* cited by examiner

RECIPROCATING DRIVE MECHANISM AND POWER TOOL INCLUDING THE SAME

This application claims priority under 35 U.S.C. §119 to patent application no. CN 201310335283.0 filed on Aug. 2, 2013 in China, the disclosure of which is incorporated herein by reference in its entirety.

TECHNICAL FIELD

The present invention relates to a reciprocating drive mechanism for a power tool and a power tool comprising such a reciprocating drive mechanism.

BACKGROUND ART

Nowadays, power tools, especially wobble-driven reciprocating saws, are easier to be operated, and their dimensions become more compact. In a reciprocating saw, a counterweight as a balance mechanism is used to minimize vibration of the reciprocating saw during operation, thereby protecting users from the risk of fatigue or being cut when using the reciprocating saw.

In GB 2256905A, a portable power-driven electrical reciprocating saw is disclosed, which comprises a dual wobble plate including a front wobble plate and a back wobble plate, a wobble arm of the front wobble plate driving a spindle to reciprocate, while a wobble arm of the back wobble plate driving a counterweight to reciprocate with a 180° phase deviation relative to the spindle, so as to realize counterbalance function of the reciprocating saw during operation. Although the counterweight of this reciprocating saw is coaxial with the spindle to gain proper counterbalance effect and reduce vibration, the overall dimension of the reciprocating saw is very large due to the dual wobble plate, so it is not suitable for the reciprocating saw to be used as a compact reciprocating saw.

In U.S. Pat. No. 7,707,729B2, another type of reciprocating saw is disclosed, which improves the structure of a wobble arm of a back wobble plate to further reduce vibration of the reciprocating saw. However, the structure of this reciprocating saw is very complicated, making it difficult for the reciprocating saw to be manufactured and maintained.

In DE 19648972B4, yet another type of reciprocating saw is disclosed. FIGS. 1 and 2 show a longitudinal section view and a cross section view of the reciprocating saw respectively. As shown in FIGS. 1 and 2, in this reciprocating saw, a rotating movement is transmitted from a small-diameter gear 1 to a sub-shaft 3 via a large-diameter gear 2, a single wobble plate 4 is then driven to reciprocate by the sub-shaft 3, the single wobble plate 4 having a front arm 5 and a back arm 6 at its opposite ends. A spindle 9 is driven to reciprocate by the front arm 5 while a counterweight 8 guided by two guiding rods 11 is driven to reciprocate by the back rum 6 via a hole 7. The structure of this reciprocating saw is simple and compact. However, due to a long distance between the gravity center 10 of the counterweight 8 and the hole 7, as shown in FIG. 2, an additional torque load is created therebetween. Further, due to a long distance between the gravity center 10 of the counterweight 8 and the guiding rods 11, an additional torque load is created therebetween as well. These torque loads cause the counterweight 8, the hole 7 and the guiding rods 11 to be worn faster, thereby shortening their service life. In addition, due to a long distance between the gravity center 10 of the counterweight 8 and the gravity center of the spindle 9, a heavy torque load is created between the counterweight 8 and the spindle 9, thereby increasing vibration of the reciprocating saw.

SUMMARY OF THE INVENTION

An object of the invention is to provide a wobble-driven reciprocating saw with counterbalance function and an efficient, simple and compact structure.

For this end, the invention provides a reciprocating drive mechanism for a power tool comprising: a rotatably mounted transmission shaft having a first central axis; a spindle comprising a spindle body having a second central axis parallel with the first central axis; a counterweight for linearly reciprocating motion under the guide of at least one guiding rod, the counterweight having a counterweight body; and a wobble plate mounted on the transmission shaft and comprising first arm and second arms extending in opposite directions, the first arm and second arms cooperating with the spindle and the counterweight respectively, so that upon rotation of the transmission shaft the first and second arms of the wobble plate drive the spindle and the counterweight to reciprocate in opposite directions parallel to the second central axis; wherein an angle is formed between the extending direction of the first arm and the second arm and a plane defined by the first central axis and the second central axis.

According to a preferred embodiment, the counterweight body is provided between the spindle and the wobble plate, and shaped to mate with a space between the spindle and the wobble plate, so that the gravity center of the counterweight is close to the gravity center of the spindle.

According to a preferred embodiment, the spindle further comprises a spindle projection extending radially outwardly from the spindle body, and the counterweight further comprises a counterweight projection extending radially outwardly from the counterweight body.

According to a preferred embodiment, the spindle body is guided through at least one bushing, and the spindle projection is guided through at least one guide plate member, so that the spindle can be driven to reciprocate in a substantially linear way by the wobble plate, the at least one bushing and the at least one guide plate member being fixed relative to the power tool body.

According to a preferred embodiment, ends of both the spindle projection and the counterweight projection operatively connected with ends of both the first and second arms respectively are provided with bores, and the ends of the first and second arms are spheres each rotatably accommodated in the bores to drive the spindle and the counterweight to move.

According to a preferred embodiment, the reciprocating drive mechanism further comprises a gear transmission including a large-diameter gear and a small-diameter gear meshing with each other, the large-diameter gear being rotationally fixed to the transmission shaft, and the small-diameter gear being driven by a power source to rotate the large-diameter gem and the transmission shaft.

According to a preferred embodiment, the counterweight is provide with at least one hole for slidably receiving the at least one guiding rod, so that the counterweight can be guided to reciprocate in a substantially linear way under the guide of the at least one guiding rod, the at least one guiding rod being provided in parallel with the extending direction of the spindle.

According to a preferred embodiment, the hole is located at or close to the gravity center of the counterweight.

According to a preferred embodiment, the angle is between 10° to 45°.

According to a preferred embodiment, the invention also provides a wobble-driven reciprocating saw comprising a reciprocating drive mechanism according to the invention.

According to a preferred embodiment, the invention further provides a power tool comprising a reciprocating drive mechanism according to the invention.

DETAILED DESCRIPTION OF PREFERRED EMBODIMENTS

In this description, the term "a power tool" includes but is not limited to a reciprocating saw. Further, other types of power tools having above-mentioned features are also included within the scope of the invention.

A wobble-driven reciprocating saw, as a power tool, generally comprises a drive assembly for powering the wobble-driven reciprocating saw during cutting operation, a saw bit clamping assembly for clamping the saw bit for reciprocating, and a reciprocating drive mechanism for converting a rotating movement of the drive assembly into a reciprocating movement of the saw bit. When the wobble-driven reciprocating saw reciprocates, the movement direction of the reciprocating drive mechanism is reversed alternately, resulting in an alternate reverse movement of the direction of applying force, so that the wobble-driven reciprocating saw is subject to vibration, shortening the service life of the wobble-driven reciprocating saw, causing physiological damage to operators, and reducing comfortness in operating the power tool.

Thus, there is a need to provide a reciprocating drive mechanism with counterbalance features, so as to reduce vibration of the power tool, especially of the wobble-driven reciprocating saw.

Figure 1:
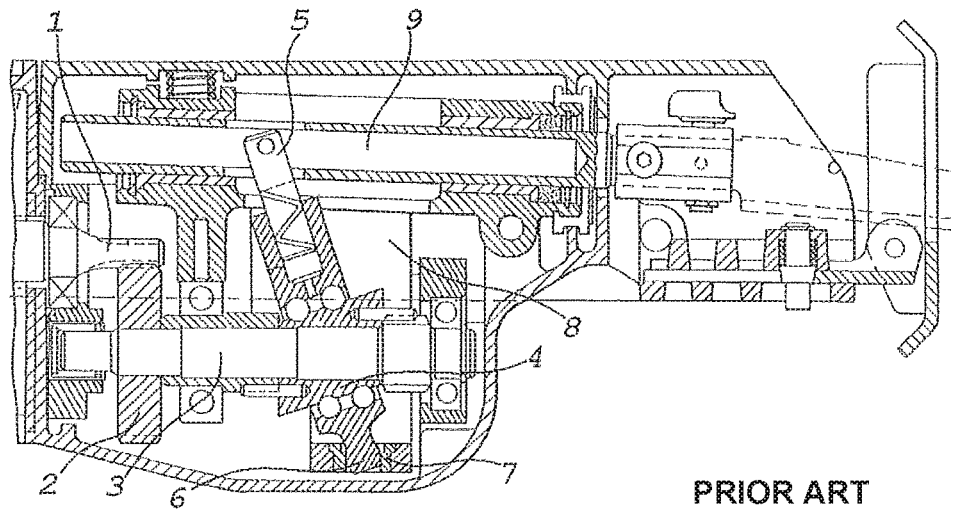
FIG. 1 shows a longitudinal section view of a reciprocating saw according to an embodiment of prior art.
Figure 2:
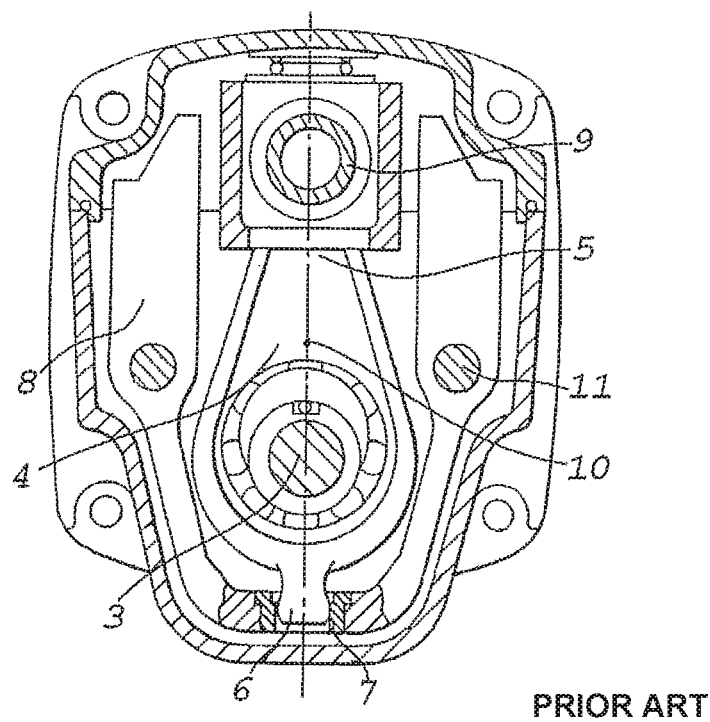
FIG. 2 shows a cross section view of the reciprocating saw according to the embodiment of prior art.
Figure 3:
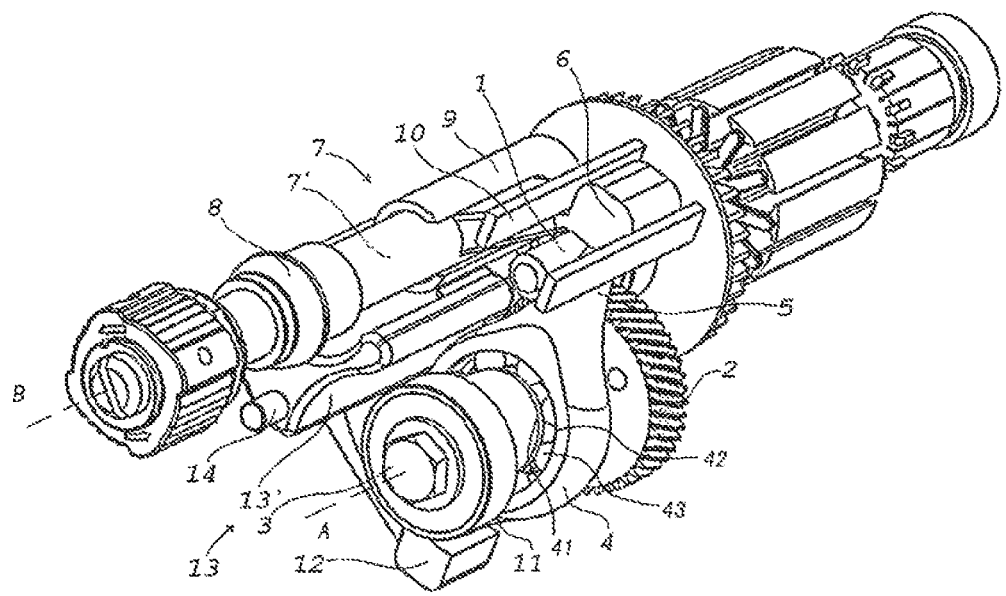
FIG. 3 shows a perspective view of a reciprocating drive mechanism according to an embodiment of the invention.

As shown in FIG. 3, a reciprocating drive mechanism according to an embodiment of the invention comprises: a rotatably mounted transmission shaft 3 having a first central axis A; a spindle 7 comprising a spindle body 7' having a second central axis B parallel with the first central axis A; a counterweight 13 for linearly reciprocating motion under the guide of at least one guiding rod 14, wherein the counterweight 13 comprises a counterweight body 13'; a large-diameter gear 2 rotationally fixed to or integrally formed with the transmission shaft 3, so as to drive the transmission shaft 3 to rotate therewith, wherein for example, a small-diameter gear 1 may be provided to mesh with the large-diameter gear 2, rotational energy produced by a motor can then be transmitted from the small-diameter gear 1 to the large-diameter gear 2; and a wobble plate 4 mounted on the transmission shaft 3 in such a way that the spindle 7 can be driven to reciprocate. How the wobble plate 4 reciprocates and causes the spindle 7 to reciprocate will be described below in details.

With further reference to FIG. 3, the wobble plate 4 comprises at its opposite ends a first arm 5 and a second arm 11, the first arm 5 extending along an arm axis 20 (shown in FIG. 4) with an angle 17 formed between it and a plane defined by the first central axis A of the transmission shaft 3 and the second central axis B of the spindle 7, so as to be cooperatively connected with the spindle 7, so that the spindle 7 can be driven to reciprocate by the wobble plate 4. The second arm 11 extends along the arm axis 20 in a direction opposite to the extending direction of the first arm 5 with the same angle, so as to be cooperatively connected with the counterweight 13, so that the counterweight 13 can be simultaneously driven to reciprocate in a direction opposite to the movement direction of the spindle 7 by the wobble plate 4. Here, various known ways may be adopted to connect the spindle 7 with the first arm 5 and the counterweight 13 with the second arm 11. Preferably, the spindle 7 further comprises a spindle projection 6 extending radially outwardly from the spindle body 7', and the counterweight 13 further comprises a counterweight projection 12 extending radially outwardly from the counterweight body 13'. Ends of both the spindle projection 6 and the counterweight projection 12 which are respectively connected with ends of both the first and second arms 5, 11 are provided with bores, and the ends of the first and second arms 5, 11 are spheres rotatably accommodated in the bores, so that the spindle 7 and the counterweight 13 can be driven by the first and second arms 5, 11 respectively. The wobble plate 4 further comprises an inner ring 41 and an outer ring 42, the inner ring 41 being rotationally fixed to the transmission shaft 3, and the central axis of the inner ring 41 being arranged obliquely with respect to the first central axis A of the transmission shaft 3. The inner ring 41 may alternatively be formed integrally with the transmission shaft 3. The outer ring 42 is connected with the first and second arms 5, 11. A roller track (not shown) is provided between the inner ring 41 and the outer ring 42 and with rollers 43 therein, so that the inner ring 41 may rotate with respect to the outer ring 42. When the obliquely provided inner ring 41 is caused to rotate by the transmission shaft 3, the outer ring 42 of the wobble plate 4 will reciprocate in the extending direction of the transmission shaft 3. This arrangement of the wobble plate 4 is known in the field.

The spindle body 7' of the spindle 7 is guided to reciprocate in a linear path defined between two bushings 8, 9. The spindle projection 6 of the spindle 7 is provided at its both sides with two guide plates 10. When the spindle body 7' reciprocates, the spindle projection 6 guided between the two guide plates 10 follows the spindle body 7' to reciprocate linearly as mentioned above. The bushings 8, 9 and the guide plate 10 are each fixed relative to the power tool body.

Figure 4:
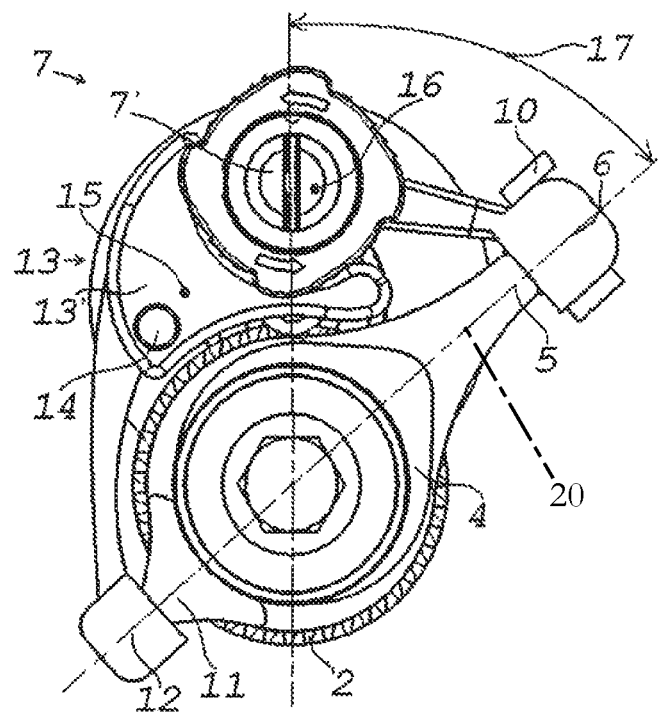
FIG. 4 shows a side view of the reciprocating drive mechanism according to the embodiment of the invention.

It can also be seen from FIG. 4 that the gravity center 16 of the spindle 7 is deviated from the second central axis B due to the presence of the spindle projection 6, but this deviation is negligible as the spindle body 7' is the main mass part of the spindle 7.

The counterweight body 13' of the counterweight 13 is located at a space between the spindle 7 and the wobble plate 4, resulting in an arrangement as compact as possible. Thus, variable torques caused by a distance between the gravity center 15 of the counterweight 13 and the gravity center 6 of the spindle 7 can be diminished, reducing vibration of the reciprocating drive mechanism. Preferably, the counterweight 13 is formed to mate with the shape of the space between the spindle 7 and the wobble plate 4, so that the gravity center 15 of the counterweight 13 is close to that of the spindle 7. The counterweight 13 may be guided under the guiding rod 14 provided in parallel with the extending direction of the spindle 7 in various ways. For example, at least one hole slidably receiving the at least one guiding rod 14 may be provided on the counterweight 13, so that the counterweight 13 can reciprocate in a defined linear way under the guide of the at least one guiding rod 14. Preferably, the hole is located at or close to the gravity center of the counterweight 13.

With further reference to FIG. 4, the gravity center 15 of the counterweight 13 is located between the first central axis A of the transmission shaft 3 and the second central axis B of the spindle 7. Although the gravity center 15 of the counterweight 13 is deviated in a direction close to the first central axis A due to the presence of the counterweight projection 12, the deviation is negligible as the counterweight body 13' is the main mass part of the counterweight 13. The gravity center 15 of the counterweight 13 is set to be closer to the gravity center 16 of the spindle 7.

When the power tool using the reciprocating drive mechanism according to the invention is operated, the rotating movement is transmitted from the motor (not shown) driving the small-diameter gear 1 to the large-diameter gear 2, and the large-diameter gear 2 then causes the transmission shaft 3 to rotate therewith, resulting in the outer ring 42 of the wobble plate 4 to reciprocate. When the outer ring 42 of the wobble plate 4 moves towards one side during reciprocating, the spindle 7 is driven to move in its extending direction by the first arm 5 of the wobble plate 4, and at the same time the counterweight 13 is driven, by the second arm 11 of the wobble plate 4, to move in a direction substantially parallel with the second central axis B and opposite to the movement direction of the spindle 7. When the outer ring 42 of the wobble plate 4 moves towards the other side, the spindle 7 and the counterweight 13 are caused to reverse simultaneously. When the spindle 7 and the counterweight 13 are to reverse, reacting forces derived from the counterweight 13 and the spindle 7 due to the alteration of the movement direction are applied to the first and second arms 5, 11 respectively. As the directions of the reacting forces applied to the first and second arms 5, 11 are opposite to each other, the reacting forces are counteracted with each other to achieve balance.

The first and second arms 5, 11 of the wobble plate 4 are disposed along the arm axis 20 (shown in FIG. 4), which is arranged with the angle 17, preferably between 10° and 45°, being formed between their extending directions and the plane defined by the first central axis A of the transmission shaft 3 and the second central axis B of the spindle 7, so that the power tool having the reciprocating drive mechanism according to the invention can be better operated. Compared with an overall arrangement without the angle, there are advantages when the angle 17 is formed between the extending direction of the first and second arms 5, 11 along the arm axis 20 and the plane defined by the first central axis A and the second central axis B. First, the spindle 7 can be provided closer to the transmission shaft 3 without being affected by the length of the first and second arms 5, 11. This means that the gravity center 16 of the spindle 7 can be made closer to the central axis of the transmission shaft 3, so that the arrangement of the spindle 7 and the transmission shaft 3 is more compact. Second, a connection point 12 to connect the counterweight 13 with the second arm 11 can be made closer to the gravity center 15 of the counterweight 13. When the counterweight 13 is driven by the second arm 11 of the wobble plate 4, a torque load between the connection point 12 and the gravity center 15 of the counterweight 13, applied to the guiding rod 14, can be reduced due to a shorter distance therebetween, so that the wear of the guiding rod 14 can be reduced. Third, due to a shorter distance between the gravity center 19 of the spindle 7 and the gravity center 16 of counterweight 15, the reduction of vibration can be realized with the better counterbalance-functional reciprocating drive mechanism. In general, the overall dimension of the reciprocating saw is made more compact, and the work efficiency of the reciprocating drive mechanism can be improved with reduced vibration and less wear.

While certain embodiments of the invention have been described here, they are presented by way of explanation only and are not intended to limit the scope of the invention. Various modifications, substitutions and changes can be made by those skilled in the art within the scope and spirit of the invention as defined in the attached claims and their equivalents.

The invention claimed is:

1. A reciprocating drive mechanism for a power tool, comprising:
   a rotatably mounted transmission shaft having a first central axis;
   a spindle comprising a spindle body having a second central axis parallel with the first central axis;
   a counterweight configured for linearly reciprocating motion guided by at least one guiding rod, the counterweight having a counterweight body; and
   a wobble plate mounted on the transmission shaft and comprising a first arm and a second arm,
   wherein a length of the first arm and a length of the second arm extend along an arm axis,
   wherein the length of the first arm and the length of the second arm extend lengthwise in opposite directions, relative to the transmission shaft, along the arm axis,
   wherein the first arm is configured to cooperate with the spindle and the second arm is configured to cooperate with the counterweight so that, upon rotation of the transmission shaft, the first arm drives the spindle and the second arm drives the counterweight such that the spindle and the counterweight reciprocate in opposite directions parallel to the second central axis, and
   wherein the arm axis intersects a plane that is defined by the first central axis and the second central axis.

2. The reciprocating drive mechanism according to claim 1, wherein the counterweight body is disposed between the spindle and the wobble plate and shaped to mate with a space between the spindle and the wobble plate so that the gravity center of the counterweight is close to the gravity center of the spindle.

3. The reciprocating drive mechanism according to claim 1, wherein:
   the spindle further comprises a spindle projection extending radially outwardly from the spindle body, and
   the counterweight further comprises a counterweight projection extending radially outwardly from the counterweight body.

4. The reciprocating drive mechanism according to claim 3, wherein the spindle body is guided through at least one bushing and the spindle projection is guided through at least one guide plate member so that the spindle is configured to be driven to reciprocate in a substantially linear direction by the wobble plate, the at least one bushing and the at least one guide plate member being fixed relative to the power tool body.

5. The reciprocating drive mechanism according to claim 3, wherein:
   ends of the spindle projection are operatively connected with ends of the first arms,
   ends of the counterweight projection are operatively connected with ends of the second arms, the ends of the spindle projection and the ends of the counter projection are configured with bores, the ends of the first arms are configured as spheres rotatably accommodated in the bores of the ends of the spindle projection to drive the spindle to move, and the ends of the second arms are configured as spheres rotatably accommodated in the bores of the ends of the counterweight projection to drive the counterweight to move.

6. The reciprocating drive mechanism according to claim 1, further comprising a gear transmission including a large-diameter gear and a small-diameter gear meshing with each other, the large-diameter gear being rotationally fixed to the transmission shaft, and the small-diameter gear being driven by a power source to rotate the large-diameter gear and the transmission shaft.

7. The reciprocating drive mechanism according to claim 1, wherein the counterweight is configured with at least one hole configured to slidably receive the at least one guiding rod so that the counterweight is configured to be guided to reciprocate in a substantially linear direction under the guide of the at least one guiding rod, the at least one guiding rod being disposed in parallel with the extending direction of the spindle.

8. The reciprocating drive mechanism according to claim 7, wherein the hole is located at or close to the gravity center of the counterweight.

9. The reciprocating drive mechanism according to claim 1, wherein the arm axis intersects the plane at an angle that is between 10° to 45°.

10. A power tool, comprising:
a reciprocating drive mechanism including:
  a rotatably mounted transmission shaft having a first central axis;
  a spindle comprising a spindle body having a second central axis parallel with the first central axis;
  a counterweight configured for linearly reciprocating motion guided by at least one guiding rod, the counterweight having a counterweight body; and
  a wobble plate mounted on the transmission shaft and comprising a first arm and a second arm,
  wherein the length of the first arm and the length of the second arm extend along an arm axis,
  wherein the length of the first arm and the length of the second arm extend lengthwise in opposite directions, relative to the transmission shaft, along the arm axis,
  wherein the first arm is configured to cooperate with the spindle and the second arm is configured to cooperate with the counterweight so that, upon rotation of the transmission shaft, the first arm drives the spindle and the second arm drives the counterweight such that the spindle and the counterweight reciprocate in opposite directions parallel the second central axis,
  wherein the arm axis intersects a plane that is defined by the first central axis and the second central axis.

11. The power tool according to claim 10, wherein the power tool is configured as a wobble-driven reciprocating saw.

* * * * *